Figure 1:
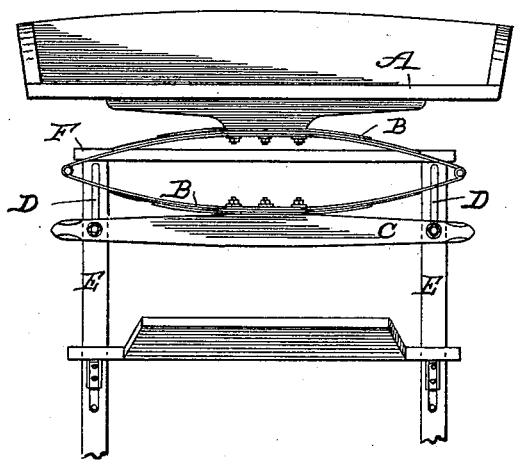

No. 614,596. Patented Nov. 22, 1898.
J. W. WILSON.
SWING SEAT FOR DRAYS.
(Application filed Apr. 7, 1898.)

(No Model.)

Witnesses

Bayard C. Ryder
A. K. Clough

Inventor

John W. Wilson
By his Attorney

UNITED STATES PATENT OFFICE.

JOHN W. WILSON, OF MANCHESTER, NEW HAMPSHIRE.

SWING-SEAT FOR DRAYS.

SPECIFICATION forming part of Letters Patent No. 614,596, dated November 22, 1898.

Application filed April 7, 1898. Serial No. 676,739. (No model.)

*To all whom it may concern:*

Be it known that I, JOHN W. WILSON, a citizen of the United States, residing at Manchester, in the county of Hillsborough and State of New Hampshire, have invented certain new and useful Improvements in Swing-Seats for Heavy Drays; and I do hereby declare the following to be a full, clear, and exact description of the invention, such as will enable others skilled in the art to which it appertains to make and use the same.

Drivers of heavy trucks and wagons experience much annoyance and often suffer injury from the severe shock encountered in driving over roughly-paved streets or those which are out of repair. The vertical motion can be easily overcome by setting the seat on springs; but the most trying of these shocks which the driver of such vehicles must necessarily endure are the severe lateral jars, which in some instances seriously affect the kidneys and other internal organs.

The object of this invention is to overcome these difficulties by so hanging a seat on such vehicles as to avoid any sudden lateral or a vertical jar being felt injuriously by the driver; and the invention consists in mounting a seat so that it will move laterally independently of the truck or wagon to which it is attached, as fully set forth in the following specification and claims and clearly illustrated in the drawings accompanying and forming a part of the same, in which—

Figure 2:
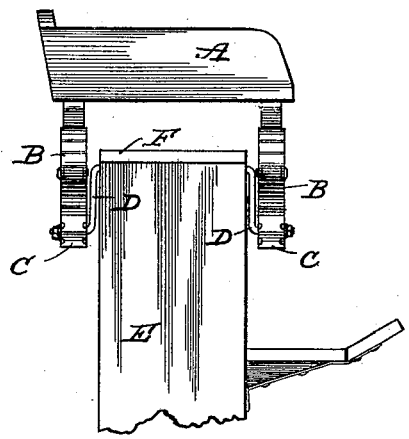
Figure 3:
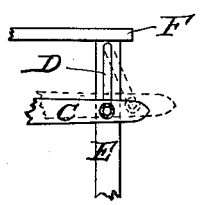

Figure 1 is an elevation showing a spring-seat for heavy trucks embodying my improvements, Fig. 2 being an end view of the same. Fig. 3 is a detail for the better illustration of my improvement.

Similar reference-letters designate corresponding parts in all the views.

A represents a driver's seat for heavy vehicles, mounted on front and rear elliptical springs B. The lower part of each spring is bolted to a bar C, which bars are supported by rockers D, one end of each rocker being pivotally attached near each end of said bars C and having their other end pivotally connected to opposite sides of a pair of standards E, which rise from and are properly secured to the floor of a truck and connected at their top by a board F, as clearly shown in Figs. 1 and 2. By this means a seat not only yields vertically when a vehicle passes rough places in a street, but it also moves sidewise by means of the rockers D, (the movement of which is shown best in dotted lines in Fig. 3,) which permits the seat to remain nearly stationary or to resist the less severe lateral motions of the vehicle and to move with less severity and suddenness when the vehicle encounters the more severe shocks in a lateral direction, so the shocks which the driver of such a vehicle ordinarily sustains are reduced to a minimum.

Having described my invention, what I claim is—

1. In a driver's seat for heavy-draft vehicles, a support or frame mounted on the floor of said vehicle, vertically-disposed rockers depending from the front and rear of said support, and front and rear horizontal bars supporting the seat and pivotally connected to said rockers.

2. In a driver's seat for heavy-draft vehicles, a suitable frame or support rising from the floor of said vehicle, vertically-disposed rockers depending from the front and rear portion of said support, front and rear horizontal bars pivotally connected to said rockers, and suitable springs connecting said bars with a seat, all substantially for the purpose set forth.

3. In a device of the character described, the combination with a pair of standards, of a rocker mounted upon each standard, said rockers comprising a horizontal bar passing through the standards, and cranks upon the opposite ends of said bars, beams pivotally connected at their opposite extremities to the cranks of the rockers, elliptical springs mounted upon said beams, and a seat mounted upon said springs, substantially as specified.

In testimony whereof I affix my signature in presence of two witnesses.

JOHN W. WILSON.

Witnesses:
 J. B. THURSTON,
 EMILE H. TARDIVEL.